US012620542B2

(12) United States Patent
Domejean et al.

(10) Patent No.: US 12,620,542 B2
(45) Date of Patent: May 5, 2026

(54) ELECTRICAL PROTECTION DEVICES AND SYSTEMS

(71) Applicant: Schneider Electric Industries SAS, Rueil-Malmaison (FR)

(72) Inventors: Eric Domejean, Voreppe (FR); Jérôme Brenguier, L'Albenc (FR); Frédéric Court, Saint Nicolas de Macherin (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 223 days.

(21) Appl. No.: 18/290,471

(22) PCT Filed: May 19, 2022

(86) PCT No.: PCT/EP2022/063542
§ 371 (c)(1),
(2) Date: Nov. 14, 2023

(87) PCT Pub. No.: WO2022/243419
PCT Pub. Date: Nov. 24, 2022

(65) Prior Publication Data

US 2024/0274389 A1 Aug. 15, 2024

(30) Foreign Application Priority Data

May 20, 2021 (FR) ...................................... 2105287

(51) Int. Cl.
*H01H 71/12* (2006.01)
*H01H 71/04* (2006.01)

(52) U.S. Cl.
CPC .......... *H01H 71/04* (2013.01); *H01H 71/123* (2013.01); *H01H 2071/048* (2013.01); *H01H 2071/124* (2013.01)

(58) Field of Classification Search
CPC .... H01H 71/123; H01H 71/04; H01H 71/125; H01H 71/24; H01H 71/40; H01H 33/596;
(Continued)

(56) References Cited

U.S. PATENT DOCUMENTS 8,772,983 B2 * 7/2014 Filippenko ............. H01H 71/70
307/139
11,037,749 B2 * 6/2021 Kouroussis ........ H01H 71/1009
(Continued)

FOREIGN PATENT DOCUMENTS

DE 202015106694 U1 5/2016
EP 2234136 A1 9/2010
WO 2021043497 A1 3/2021

OTHER PUBLICATIONS

International Search Report and Written Opinion dated Sep. 26, 2022 for corresponding International Application No. PCT/EP2022/063542, 9 pages.

*Primary Examiner* — Bryan R Perez
(74) *Attorney, Agent, or Firm* — Quinn IP Law

(57) ABSTRACT

An electrical protection system has connection terminals, separable electrical contacts, a switching mechanism and at least one power switch connected in series with the separable electrical contacts, the switching mechanism including a displaceable control member. The electrical protection system further includes an electronic control circuit coupled to the at least one power switch and a sensor coupled to the control member for measuring a position of the switching mechanism. The electronic control circuit is configured to switch the at least one power switch to a blocking state when the sensor detects that the switching mechanism reaches a position preceding a position in which the electrical contacts separate.

14 Claims, 11 Drawing Sheets

(58) Field of Classification Search
CPC ....... H01H 2071/124; H01H 2071/048; H01H 9/548; H01H 9/52; H01H 9/02; H01H 9/0271; H01H 9/56; H01H 9/0005; H01H 9/0027; H01H 9/10; H01H 9/20; H01H 9/32; H01H 9/54
See application file for complete search history.

(56) References Cited

U.S. PATENT DOCUMENTS

| | | | | |
|---|---|---|---|---|
| 2017/0345600 | A1 | 11/2017 | Naumann et al. | |
| 2019/0131099 | A1* | 5/2019 | Fleitmann .............. | H01H 71/74 |

* cited by examiner

ELECTRICAL PROTECTION DEVICES AND SYSTEMS

TECHNICAL FIELD

The present invention relates to the technical field of electrical protection devices and systems, such as circuit breakers.

PRIOR ART

Many electrical switching devices of electromechanical type, such as air circuit breakers, and in particular miniature circuit breakers (MCBs) generally comprise a quenching chamber. The quenching chamber is configured to extinguish an electric arc that appears in the air between the electrical contacts of the device when the electrical contacts are separated after the device is tripped.

The quenching chamber typically comprises a stack of metal plates that are superposed one above the other to lengthen and extinguish the electric arc. One or more apertures in the casing allow the quenching gases to be discharged from the device.

However, in order to improve the performance of these protection devices, it has been proposed to replace the quenching chamber with an electronic breaking device comprising power switches based on semiconductor components.

Such improved performance is advantageous, for example, in direct-current (DC) electrical systems comprising batteries of electrochemical accumulators, as the electrical protection devices of such systems must be capable, in the event of the occurrence of an electrical fault, of interrupting high-amplitude currents with a very rapid reaction time.

These semiconductor-based protection devices must be capable of interrupting the electrical current with at least as much reliability as electromechanical protection devices.

In addition, for safety reasons, these protection devices must be galvanically isolated. It is therefore advantageous to preserve separable electrical contacts as they allow an air gap to be formed when the device is in the open state (i.e., when the electrical contacts are separated, for example after the device has been tripped, or when a user wishes to isolate the installation located downstream of the protection device).

Moreover, for the sake of compatibility with existing installations, it would be desirable for these protection devices to be able to be contained in a casing having the same size as the casings of switching devices of electromechanical type.

There is therefore a need for electrical protection devices, such as circuit breakers, based on semiconductor components, which at least partially remedy these drawbacks.

SUMMARY OF THE INVENTION

To this end, one aspect of the invention relates to an electrical protection system, comprising connection terminals, separable electrical contacts connected between the connection terminals, a switching mechanism and at least one power switch connected in series with the separable electrical contacts, the separable electrical contacts being movable between an open state and a closed state, the switching mechanism comprising a mobile control member and being coupled to the separable electrical contacts with a view to switching the separable electrical contacts to the open state, the electrical protection system further comprising an electronic control circuit coupled to said at least one power switch.

The electrical protection system further comprises a sensor coupled to the control member and configured to measure a position of the switching mechanism, and the electronic control circuit is configured to switch said at least one power switch to an off state when the sensor detects that the switching mechanism has reached a position preceding a position from which the electrical contacts separate.

By virtue of the invention, in the opening phase, the control circuit and the sensor allow the power switches to be switched to their off state before the electrical contacts are separated, this preventing the occurrence of an electric arc and thus allowing the current to be interrupted safely. In contrast, once the contacts are in the open position, the electrical contacts allow an air gap to be created. This prevents electrical current, such as leakage current from the power switches, or current resulting from a failure of these power switches, from being able to flow anew between the terminals after the device has been tripped.

According to some advantageous but non-mandatory aspects, such an electrical protection device may incorporate one or more of the following features, taken alone or in any technically permissible combination:

- the electronic control circuit is configured to switch said at least one power switch to the off state when an electrical fault is detected by a measuring circuit;
- the electrical protection system comprises an internal electrical power supply configured to electrically power the electrical control circuit using the electrical voltage across the connection terminals;
- said at least one power switch is a MOSFET;
- said at least one power switch is normally open;
- the sensor is an optical sensor configured to measure the position of the control member of the switching mechanism;
- the electronic control circuit comprises a plate-shaped substrate and a conductive plate making contact with a metal backing of said corresponding at least one power switch, said at least one power switch and its respective conductive plate being mounted on one or each face of the substrate;
- at least one of the conductive plates comprises a segment configured to form a fixed electrical contact that interacts with the mobile electrical contact to form together said separable electrical contacts;
- the movement of the control member is offset with respect to the movement of the contacts;
- the switching mechanism is a toggle mechanism;
- the electrical protection system is configured such that, to close the separable electrical contacts, the control member is intended to be moved to the corresponding position by a user, this movement, by way of a link rod of the switching mechanism, driving a hook of the switching mechanism to rotate, the hook becoming hooked on a tripping bar of the switching mechanism, the link rod then driving a deck of the switching mechanism to rotate until the separable electrical contacts close;
- the electronic control circuit is configured to switch said at least one power switch to an off state when the sensor detects that the switching mechanism has reached a position immediately preceding a position from which the electrical contacts separate.

According to another aspect, the invention relates to an electrical protection device comprising a casing and the electrical protection system such as defined above, wherein the electrical protection device is a miniature circuit breaker.

According to another aspect, the electronic control circuit and said at least one power switch are housed in a dedicated compartment inside the casing.

According to another aspect, the width of the casing is a multiple of 9 mm.

According to another aspect, the electrical protection device is an air circuit breaker.

BRIEF DESCRIPTION OF THE FIGURES

The invention will be better understood and other advantages thereof will become more clearly apparent in the light of the following description of an embodiment of an electrical protection system, which description is given merely by way of example and with reference to the appended drawings, in which.

DETAILED DESCRIPTION OF CERTAIN EMBODIMENTS

Figure 1:
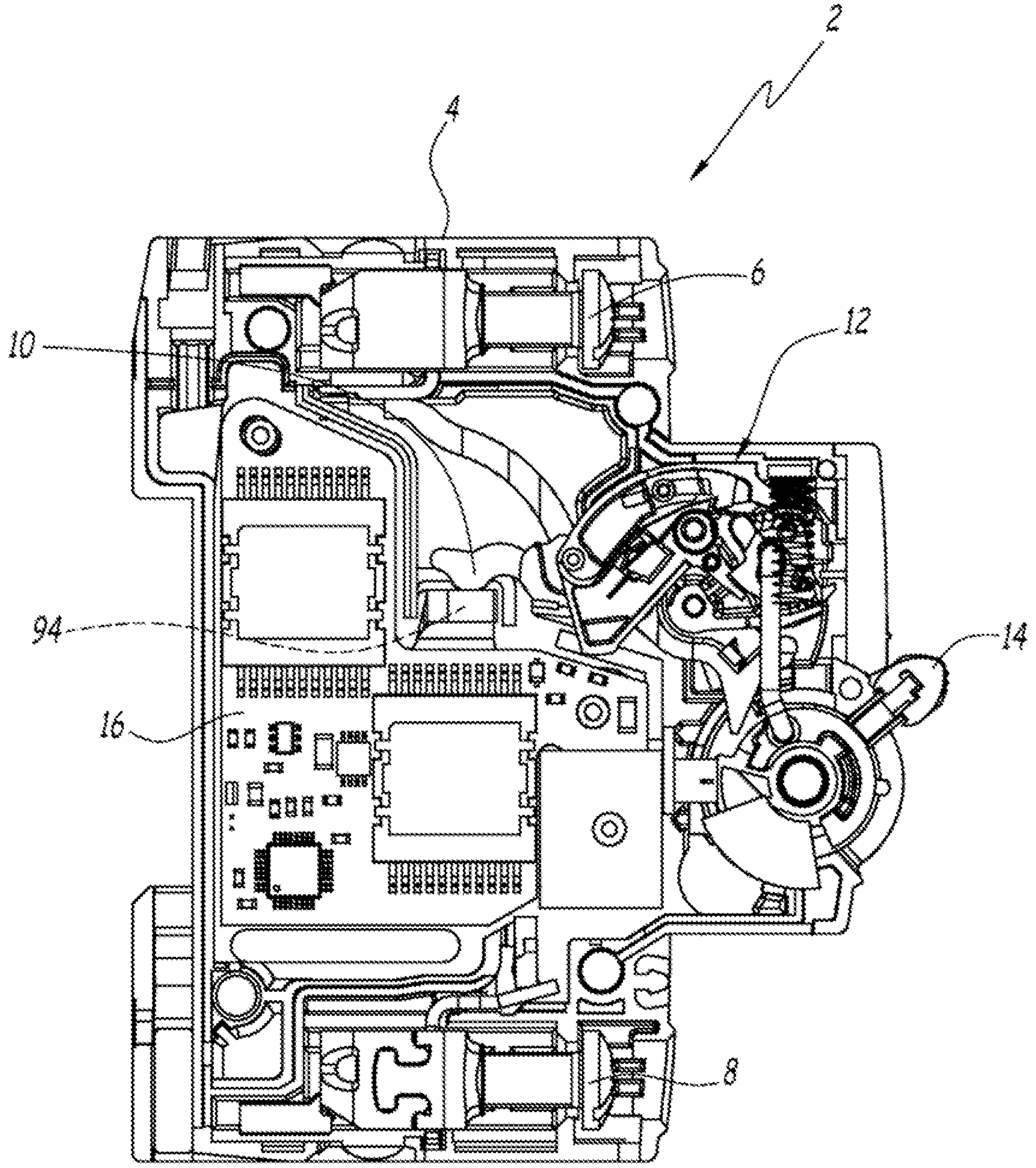
FIG. 1 is a schematic representation, seen in cross section, of an electrical protection device according to embodiments of the invention.
Figure 2:
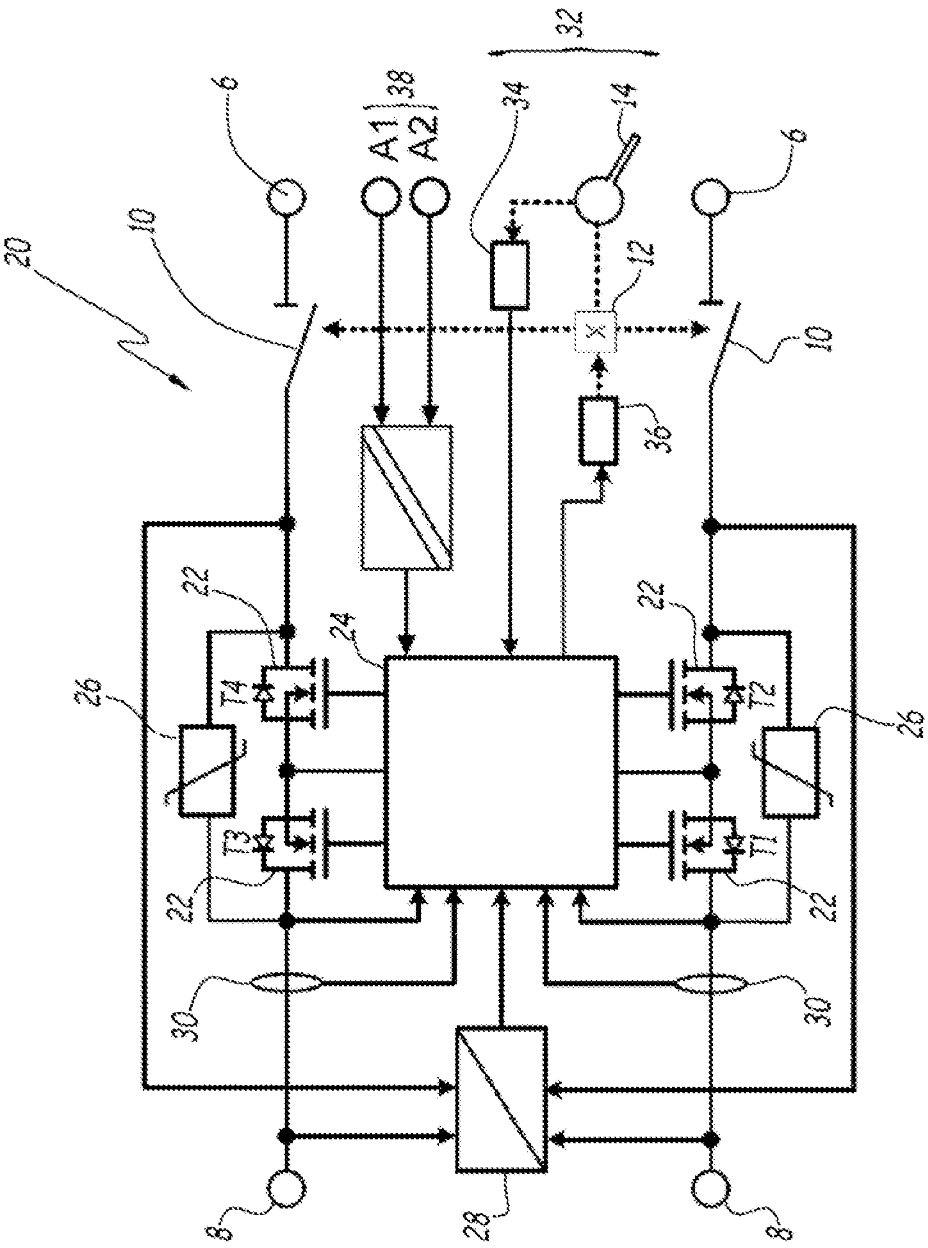
FIG. 2 is a functional diagram of the electrical protection device of FIG. 1, in the case of a two-pole device.

FIGS. 1 and 2 schematically represent an electrical protection system and device 2 according to embodiments of the invention.

In many embodiments, the electrical protection device 2 is a circuit breaker.

Preferably, the device 2 is a miniature circuit breaker.

The device 2 here comprises a casing 4 inside of which are housed at least some of the components of the device 2.

For example, the device 2 is an air circuit breaker.

The casing 4 is preferably manufactured from a rigid, electrically insulating material such as a thermoformed polymer, polyamide PA 6.6 for example, or any other suitable material.

For example, the casing 4 is a casing made of molded plastic.

Preferably, the dimensions of the casing 4, and in particular the width of the casing or the aspect ratio of the casing 4, are compatible with the dimensions of the casings of existing protection devices 4.

In one non-limiting example of implementation given by way of illustration, the width of the casing is preferably a multiple of 9 mm, and for example equal to 9 mm, or to 18 mm, or to 27 mm.

It will be understood that, in this example, the components of the electrical protection system are housed in the same casing 4. However, in certain variants, certain components could be housed in different casings. Everything described here with reference to the device 2 is therefore generalizable to an electrical protection system 2 that can be dissociated from the casing 4.

The device 2 also comprises connection terminals 6 and 8, separable electrical contacts 10 connected between the connection terminals 6 and 8 and a switching mechanism 12 comprising a control member 14 (also referred to as a control knob or control lever below). The control lever 14 is, for example, a pivotable lever accessible from outside the casing 4 and intended to be manipulated by a user.

For example, the contacts 10 may be formed by associating a fixed electrical contact and a mobile electrical contact that is movable with respect to the fixed contact, the switching mechanism 12 being coupled to the mobile mechanical contact.

In practice, each electrical contact 10 may comprise a plurality of electrical contact fingers, although other implementations are possible as variants.

The separable electrical contacts are movable between an open state and a closed state. In the open state, the contacts 10 are separated from each other by a volume of ambient air acting as an electrical insulator, i.e. an air gap, this preventing an electrical current from flowing.

In the example of FIG. 2, the device 2 comprises two pairs of connection terminals 6,8: a first input terminal 6 connected to a first output terminal 8 by way of a first connection line, and a second input terminal 6 connected to a second output terminal 8 by way of a second connection line.

This example, which is given for the purposes of illustration, corresponds to the case of a two-pole device (with two electric poles, or two electric phases). However, other examples are possible.

In many embodiments, the switching mechanism 12 is configured to move the electrical contacts 10 to an open state in response to a switching command. The switching command may be sent by a tripping device or result from an action of a user on the control lever 14.

For example, the switching mechanism 12 is a toggle mechanism, such as a switching mechanism analogous or similar to the switching mechanism described in patents EP 2975628 B1 or EP 1542253 B1.

The device 2 also comprises an electronic breaking module 16 that is configured to interrupt an electrical current between the connection terminals 6 and 8. The electronic breaking module 16 is here based on solid-state switching components, in particular semiconductor components, such as power transistors. In this respect, the device 2 differs from electromechanical air protection devices, which comprise a quenching chamber (arc-extinguishing chamber).

Preferably, the electronic breaking module 16 is accommodated in a dedicated housing of the casing 4. Even more preferably, when the casing 4 is of the same type as (or even identical to) the casings of electromechanical protection devices, said housing corresponds to the space normally occupied by the quenching chamber and by means (of the type referred to as thermal-magnetic) for detecting an electrical fault, such as a bimetallic strip and a coil.

This makes it possible not to change the architecture of existing circuit breakers and to ensure compatibility with existing installations.

The device 2 thus comprises at least one power switch 22 connected in series with the separable electrical contacts 10.

In the illustrated example, which corresponds to the illustrative case of a two-pole device, the device 2 comprises four power switches 22, identified here by the references T1, T2, T3 and T4.

For example, the first connection line comprises two power switches T1 and T2 connected in series with the separable contact between the first terminals 6 and 8. Likewise, the second connection line comprises two power switches T3 and T4 connected in series with the second separable contact 10 between the second terminals 6 and 8. For example, each of said first and second connection lines corresponds to one electrical phase.

In practice, the number of power switches may differ depending on the topology of the device and in particular on the number of poles (single-phase, polyphase, with or without a neutral line) but also depending on the current rating of the device.

Each power switch may, in practice, be a plurality of components (such as transistors) connected in parallel depending on the rating of the circuit breaker that it is desired to produce.

For example, in the device 2, which by way of illustration and completely non-limitingly has a rating of sixteen amperes, two pairs of transistors connected in series are used, the transistors of each pair of transistors being connected in parallel. In a variant having a higher rating, for example thirty-two amps, it is possible to use a higher number of parallel-connected transistors.

Each power switch 22 is switchable between an electrically off state and an electronically on state.

For example, the power switches 22 are power transistors.

According to one preferred embodiment, the power switches 22 are metal-oxide-semiconductor field-effect transistors (MOSFETs).

This type of transistor is preferred because it has a low on-state resistance, but also because it remains in the off state when it is at rest (for example when no control signal is sent to the control electrode).

Other semiconductor technologies may however be envisioned depending on the rating of the circuit breaker, such as insulated-gate bipolar transistors (IGBTs), or thyristors, or integrated gate-commutated thyristors (IGCTs), or indeed yet other technologies.

As a variant, the power switches 22 may be junction field-effect transistors (JFETs). In this case, operation of the control circuit 24 may need to be modified, to take into account the fact that such JFETs remain in the on state when they are at rest.

In practice, a diode is present in parallel with each of the power switches 22, as illustrated in FIG. 2, although other embodiments are possible as variants. Generally, it is a question of a parasitic diode inherent to the construction of the power switch.

The electrical protection device further comprises an electronic control circuit 24 coupled to said at least one power switch 22 (i.e., to each power switch 22). In other words, the electronic control circuit 24 allows each of the power switches 22 to be controlled.

In many embodiments, the electronic control circuit 24 comprises a processor, such as a programmable microcontroller or a microprocessor.

The processor is advantageously coupled to a computer memory, or to any computer-readable data storage medium, that contains executable instructions and/or software code intended to implement a method for detecting an electrical fault when these instructions are executed by the processor.

In particular, this method makes it possible to detect an electrical fault such as current overload, a short-circuit, a differential current or presence of a series (or differential) arc in the line to be protected, but also voltage surges or voltage sags.

As variants (not described in detail), the electronic control circuit 24 may comprise a digital signal processor (DSP), or a field-programmable gate array (FPGA), or an application-specific integrated circuit (ASIC), or any equivalent element or any combination of these elements.

Advantageously, the device 2 may comprise one or more elements 26 for protecting against voltage surges, which components are connected in parallel with the one or more power switches 22, in order to protect the power switches 22 against voltage surges, particularly in case of appearance of an electric arc when the contacts 10 are separated.

This in particular allows the switches to be protected from voltages during breaking, in cases where the installation comprises inductive circuits.

For example, the protecting elements 26 are clippers or metal-oxide varistors (MOVs) or TVS diodes (TVS standing for transient voltage suppression).

In many embodiments, the device 2 comprises an internal electrical power supply 28 configured to electrically power the electrical control circuit, preferably using the electrical current that flows between the connection terminals 6, 8 when the device 2 is in operation.

As a variant, the internal electrical power supply 28 may comprise a battery, or any other means allowing a stand-alone supply of electrical power.

For example, the electronic control circuit 24 is configured to switch the power switches 22 to an open state when an electrical fault is detected by a measuring circuit 30. For example, the device 2 comprises current sensors 30, here coupled to each connection line.

For example, the electrical faults may be current surges or short-circuits, but also other electrical faults such as a differential current or presence of a series (or differential) arc in the line to be protected, or even also voltage surges or voltage sags.

When tripped (i.e., following detection of an electrical fault requiring immediate interruption of electrical current) the device 2 may be switched through the combined action of the switching mechanism 12 and power switches 22.

Furthermore, in certain embodiments, the device 2 also comprises a synchronizing system 32 intended to synchronize switching of the power switches 22 with opening of the contacts 10, with the aim of preventing electric arcs from forming as the electric contacts 10 open.

To this end, the device 2 comprises a sensor 34 configured to measure a position of the switching mechanism 12.

Preferably, the sensor is configured to measure the position of the control lever 14 of the switching mechanism 12, or of a part secured to the control lever 14.

For example, the sensor 34 is connected to an input of the electronic control circuit 24 so as to send a measurement signal. The sensor 34 may be placed facing a part of the switching mechanism 12 (for example facing the mechanical part bearing the control lever 14). In other words, the sensor 34 may be coupled to the control lever 14.

According to one non-limiting example of implementation given by way of illustration, the sensor 34 may be configured to emit a binary signal, taking a first value when the switching mechanism 12 is in a position in which the electrical contacts 10 are closed, and taking a second value (different from the first value) when the switching mechanism is in a position preceding the position from which the electrical contacts 10 begin to separate (as the lever opening movement continues).

For example, this position may correspond to a specific threshold in respect of the angular position of the control lever 14.

By way of illustration, the position threshold may correspond to an angle of 20° with respect to the original position of the control lever 14. As a variant, another angle may be chosen. In practice, the angle is preferably smaller than or equal to 20°, or smaller than or equal to 10°, or smaller than or equal to 5°.

Preferably, the sensor 34 is an optical sensor.

According to embodiments, the sensor 34 is an obstruction-based optical sensor, for example arranged such that the light signal received by a sensitive element of the sensor 34 is obstructed when the control lever 14 reaches a certain position, for example when the control lever 14 has started to move with respect to the closed position.

For example, use of an optical sensor allows the electrical installation to more easily be made safe in the event of a fault. If the emitting optical element, the optical receiver or the electronic receiver circuit malfunctions, the on-board control system automatically detects a fault (in the present case, a lack of light flux) and puts the product in the safe position as though the knob had been lowered. This is not necessarily the case with other technologies. For example, if a microswitch were to malfunction (get stuck in its rest position) it would be possible for it never to be discovered that there was a problem. Compared to a magnetic sensor (Hall sensor or Reed relay), an optical sensor has a good immunity to the magnetic field created by the passage of current through the poles of the product or adjacent products. Compared to a mechanical sensor (such as a microswitch), an optical sensor has a better robustness (number of maneuvers possible). Compared to a proximity sensor (for example a capacitive sensor), an optical sensor has a better immunity to the electric field that may be created by the presence of transient voltage surges in the poles of the product or adjacent products.

As a variant, the sensor 34 may take a different form and may thus be a mechanical sensor, or an inductive sensor with external-field compensation.

In many embodiments, the sensor 34 is housed in the same casing as the switching mechanism 12 and the control member 14. However, as a variant, the sensor 34 may be housed in a first casing and the control member 14, as well as at least one portion of the switching mechanism 12, are housed in another casing.

In particular, in devices comprising a plurality of poles (for example in a three-phase circuit breaker or a two-pole DC circuit breaker), the control members (control levers) of each pole are mechanically interconnected. In this system, it may be advantageous to provide a single sensor for the entirety of the protection device, rather than using one sensor for each pole. This single sensor may then be located remotely in another casing.

As will be explained in more detail with reference to FIGS. 2 to 6, the electronic control circuit 24 is configured to switch the one or more power switches 22 to the off state when the sensor 34 detects that the switching mechanism is moving to the open position, and more particularly before the electrical contacts 10 separate.

In optional but nevertheless advantageous embodiments, the device 2 may comprise an auxiliary sensor (not illustrated) configured to measure a position of the switching mechanism, the auxiliary sensor being configured to operate in conjunction with the optical sensor 34. This arrangement is particularly applicable to large circuit breakers, in order to improve the reliability of the detection of the position of the switching mechanism 12. This auxiliary sensor may however be omitted.

Optionally, the synchronizing device 32 may comprise an actuator 36 configured to set the switching mechanism 12 in motion. The actuator 36 for example comprises an electric motor, or an electromagnetic actuator comprising a mobile mechanical portion movable under the action of an electromagnetic actuator. For example, the actuator 36 is controlled by the electronic control circuit 24 and may thus control opening of the electrical contacts 10 by way of the mechanism 12.

In optional embodiments, an external tripping device located outside the electronic control circuit 24 may be connected to an input of the electronic control circuit 24 in order to transmit a tripping command and thus cause the device 2 to trip by way of the electronic control circuit 24.

The tripping command delivered by the external tripping device may be transmitted electronically, via a wired link or via a radio-frequency signal.

In other embodiments, the external tripping device may be mechanically coupled to the switching mechanism 12 or to the electronic control circuit 12 (for example, by way of an electromechanical sensor).

In certain implementations, an auxiliary electrical power supply 38 may be used to electrically power the electronic control circuit 24.

For example, an auxiliary power supply 38 located outside the device 2 is connected to terminals A1, A2 of the device 2, said terminals being connected to an electrical distribution circuit (such as a supply rail).

One example of operation of the switching mechanism 12 and of the synchronizing system 32 will now be described with reference to FIGS. 3 to 5.

Figure 3:
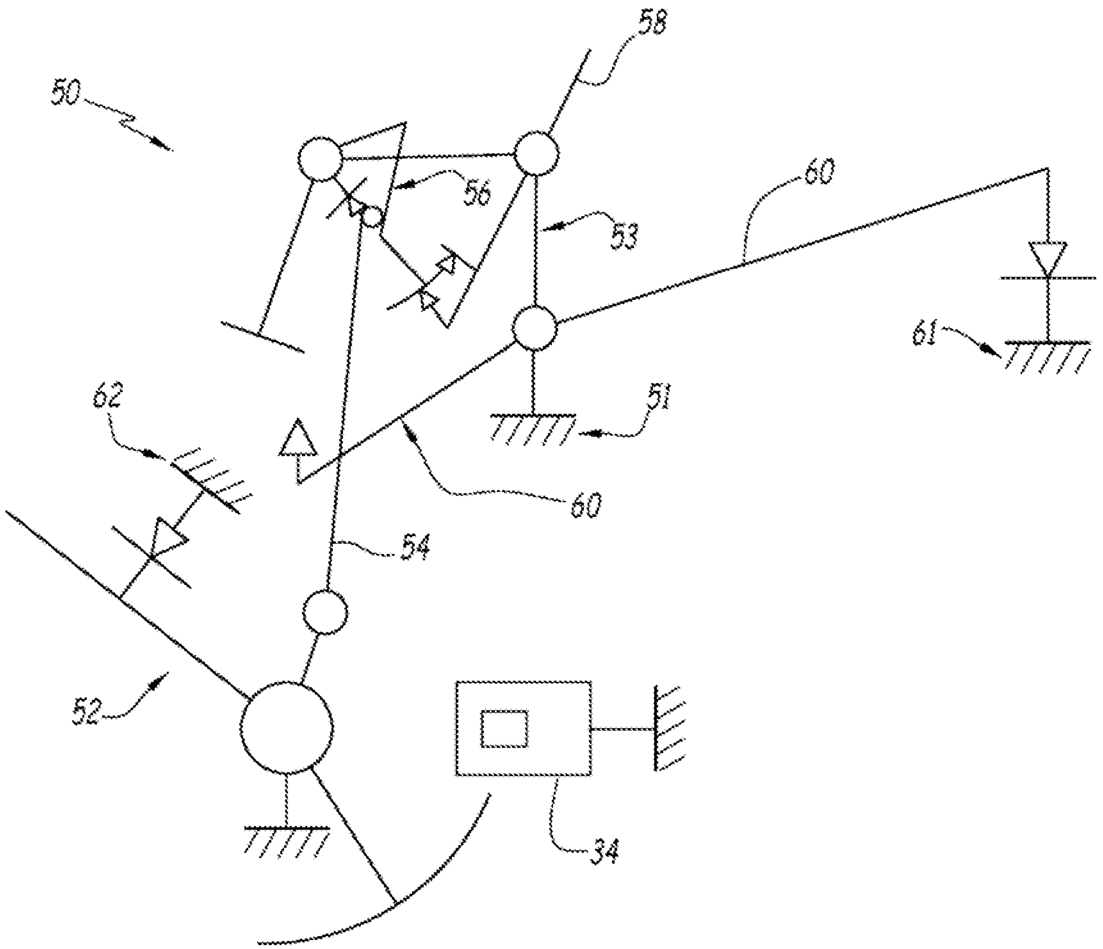
FIG. 3 is a schematic representation of a first step of a sequence of movements of a switching mechanism of the electrical protection device of FIG. 1 when the device is switched to an open state.
Figure 4:
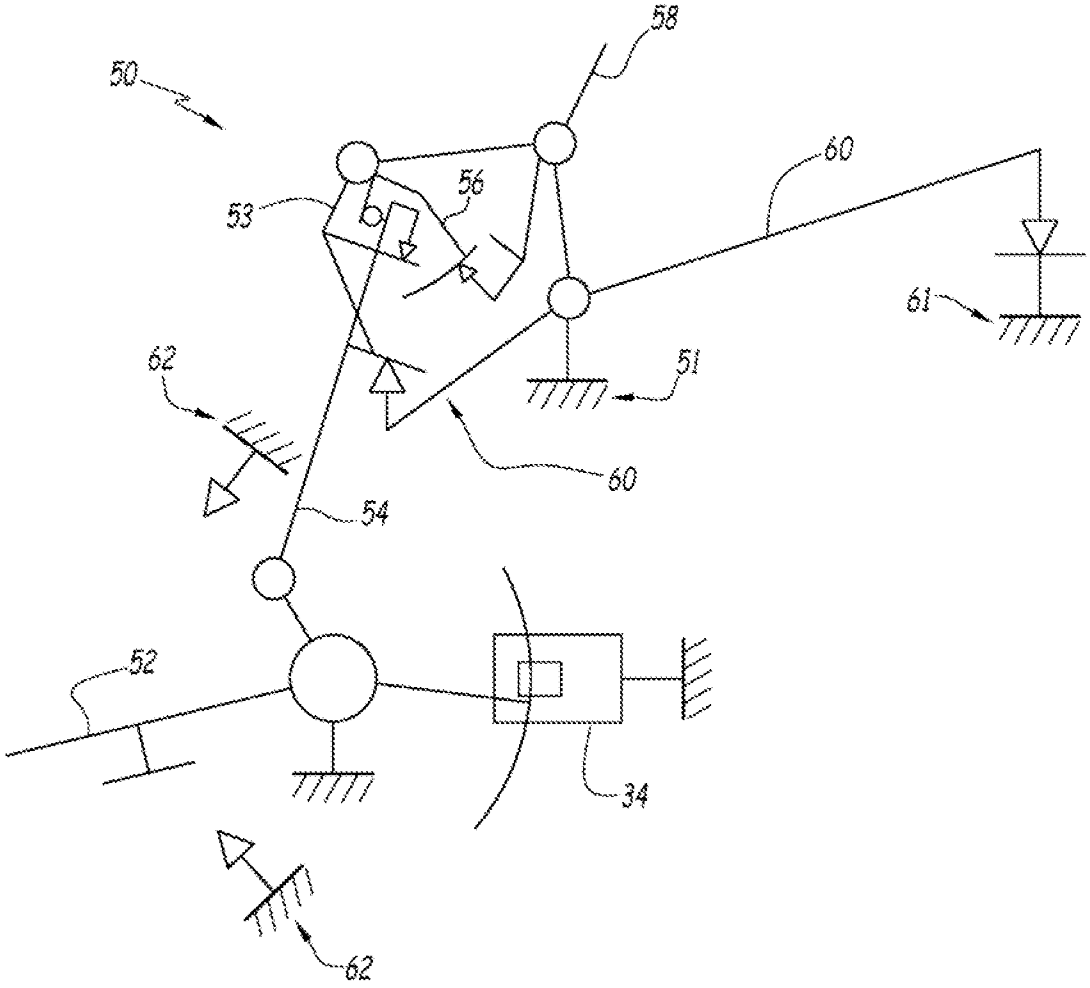
FIG. 4 is a schematic representation of a second step of a sequence of movements of a switching mechanism of the electrical protection device of FIG. 1 when the device is switched to an open state.
Figure 5:
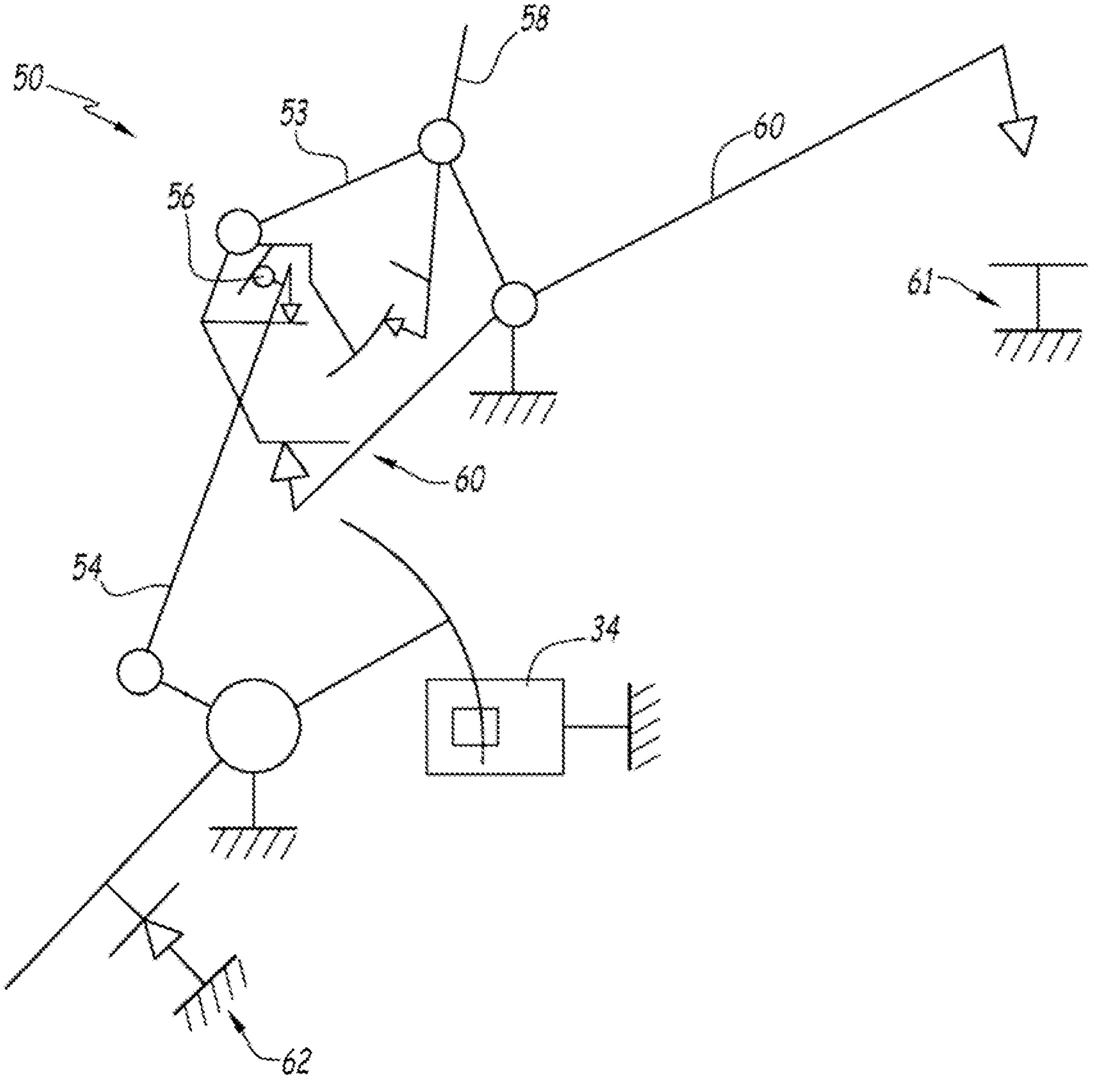
FIG. 5 is a schematic representation of a third step of a sequence of movements of a switching mechanism of the electrical protection device of FIG. 1 when the device is switched to an open state.

FIGS. 3, 4 and 5 schematically represent a simplified version 50 of the switching mechanism 12 in various successive configurations over time. More precisely, FIG. 3 corresponds to the closed state of the switching mechanism 12, in which the electrical contacts 10 make contact (in the closed state) and allow a current to flow. FIG. 5 corresponds to an open state of the switching mechanism 12, in which the electrical contacts 10 are separated from each other. FIG. 4 corresponds to an intermediate state during a transition from the closed state to the open state.

As illustrated in FIG. 3, the switching mechanism 12 comprises:

the control lever 14, which takes the form of a rotary part 52 mounted so as to be able to rotate about a rotation axle secured to the casing 4 (the hatched zones shown in FIG. 3, one of which has been designated with the reference 51, represent anchoring points which are immobile with respect to the casing 4);

- a transmission rod 54, or link rod;
- a tripping hook 56 that is rotatably mounted and coupled to the part 52 by way of the transmission rod 54;
- a deck 53 that is mounted so as to be able to rotate about a rotation axle secured to the casing 4 and that is coupled to the hook 56;
- a tripping bar 58 coupled to the deck 53 and to the hook 56;
- a contact holder 60 that bears the mobile electrical contact 10 and that interacts with the fixed electrical contact 61, the contact holder being mounted so as to be able to rotate about a rotation axle secured to the casing 4;
- stops 62 that limit the rotational movement of the control lever 52, for example in the open and closed positions respectively.

The rotation axles are here placed parallel, all thereof for example being placed perpendicular to a side wall of the casing 4.

In the tripping phase, the tripping bar 58 is driven to rotate, this releasing the hook 56 and driving rotation of the deck 53 and of the contact holder 60 to the open position. In parallel, the movement of the deck triggers a rotational movement of the part 52 by way of the transmission rod 54.

In the illustrated example, the sensor 34 is placed in such a way that, in the open state, at least one portion of the part 52 is placed in front of the sensor 34, so as for example to mask at least a sensitive portion of the sensor 34. In contrast, in the closed state, the part 52 remains distant from the sensor 34 and does not mask the sensitive portion of the sensor 34. The position from which the sensitive portion of the sensor 34 is masked by the part 52 may correspond to an angular-position threshold. When the part 52 passes in front of the sensor, the sensor 34 changes state and then sends a different measurement signal.

Figure 6:
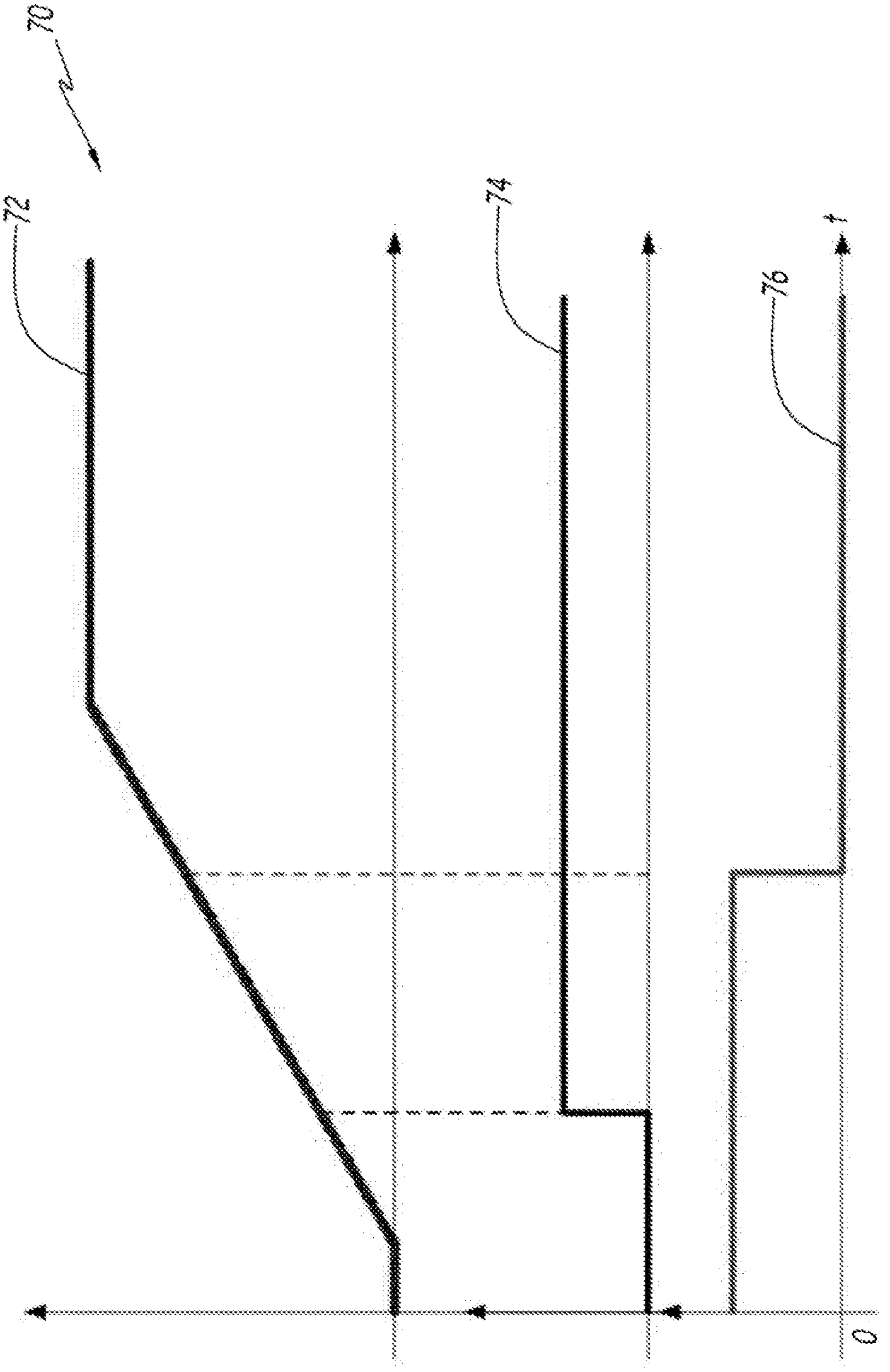
FIG. 6 is a graph showing the variation over time in the angular position of a control knob associated with the switching mechanism of FIGS. 3 to 5 while the appliance is switching to an open state.

With the configuration employed in the illustrated example, the angular-position threshold is reached at the latest just before the electrical contacts 10 begin to separate, as illustrated in FIG. 4 and in FIG. 6.

In FIG. 6, the timing diagram 70 shows the variation, as a function of time (denoted “t”, on the x-axis):

- in the position of the switching mechanism 12, here represented by the angular position of the control lever 14 (curve 72),
- in the state of the optical sensor 34 (curve 74, which may here take either a low value or a high value, depending on whether the measurement signal takes the first value or the second value, respectively);
- in the closed or open state of the separable electrical contacts 10 (curve 76, which may here take either a low value or a high value, corresponding to the open state and to the closed state, respectively).

Thus, following tripping, the angle of the control lever 14 increases to reach a threshold (represented here by the first vertical dashed line on curve 74) at which the sensor changes state. In response, the electric control circuit 24 switches the power switches 22 to their off state, in order to interrupt the flow of current. After a certain delay, here immediately after the position shown in FIG. 4, the electrical contacts 10 are finally separated by the switching mechanism 12, which then reaches the end of the opening movement.

Such an operating mode may advantageously be obtained with specific switching mechanisms, such as toggle switching mechanisms, such as those described above, in which the relative movement of the parts of the mechanism is configured to generate an angular offset between the rotation of the control lever 14 and the point when the contacts 10 actually open, for example in order to briefly delay separation of the contacts 10 when tripped open.

This offset makes it possible to compensate for a decrease in play due to the electrical contacts sinking as a result of gradual wear of the electrical contacts throughout the lifetime of the device 2.

In practice, in these embodiments, the control circuit 24 takes advantage of this offset to ensure that switching of the power switches (caused by the start of rotation of the control lever 14, such as detected by the sensor 34) anticipates separation of the electrical contacts 10.

By virtue of the invention, in the opening phase, the electronic control circuit 32 and the sensor 34 make it possible to synchronize the action of the power switches 22 and of the switching mechanism 12, in particular in order to ensure that the power switches 22 are switched to their off state before the electrical contacts 10 are separated. This prevents appearance of an electric arc between the electrical contacts 10, and thus makes it possible to interrupt the current safely.

In other words, here advantage is taken of the delay between switching of the power switches and separation of the electrical contacts that results from the design of the switching mechanism 12.

This is particularly useful when the device is used in a direct-current installation, because the separable electrical contacts 10 are generally not sufficient on their own to interrupt the current.

In contrast, once in the open position, the separable electrical contacts 10 allow an air gap to be created and prevent electrical current from flowing anew between the terminals 6 and 8 after the device 2 has been tripped.

In order to close the contacts 10 (i.e. to switch the device 2 back to the closed state), the control lever 14 is moved to the corresponding position by a user. This movement, by way of the link rod 54, causes the hook 56 to rotate and become hooked on the tripping bar 58. The link rod 54 then drives the deck 53 to rotate until the contacts 10 close.

Moreover, use of a casing 4 analogous or similar, or even identical, to the casings of electromechanical protection devices makes it possible to ensure compatibility with existing product ranges. For example, the device 2 may be mounted in a distribution board as a replacement for an earlier generation protection device without the need to modify the rest of the installation. This also makes it possible to use existing auxiliary devices.

It is advantageous to use an optical sensor 34 because such a sensor has a small size and may be easily integrated into the device 2, this allowing a compact device 2 to be produced. An optical sensor also has the advantage of being precise and of not being sensitive to surrounding electromagnetic interference (nor of being the origin of electromagnetic interference that could impair the operation of the installation or of the device 2 itself).

Lastly, using a toggle mechanism as switching mechanism 12 allows play due to the electrical contacts sinking to be taken up before the open position of the contacts is reached, as explained above.

Figure 7:
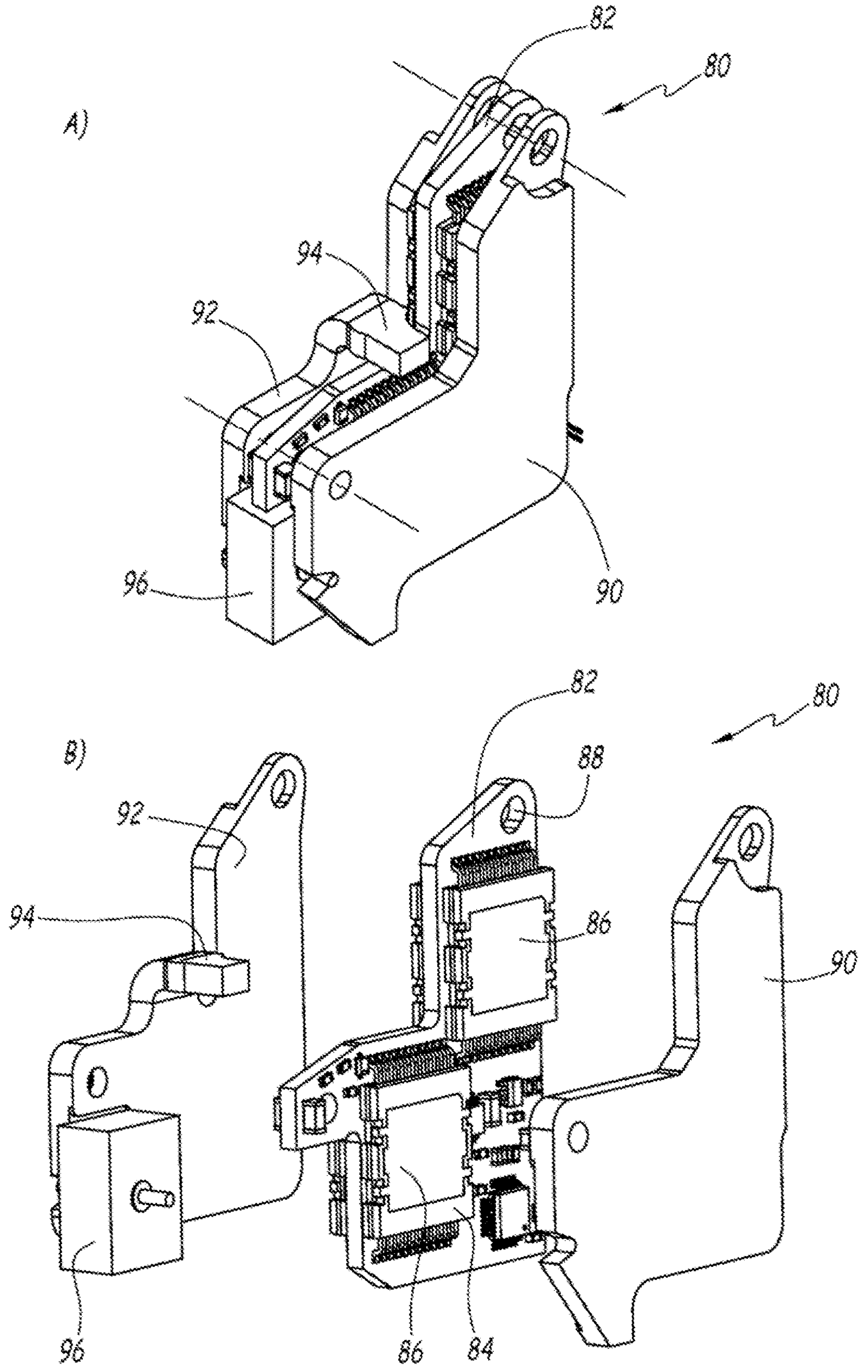
FIG. 7 is a schematic representation, seen in perspective (insert A) and exploded (insert B), of one particular embodiment of one portion of the protection device of FIG. 1.

FIG. 7 shows an advantageous but non-obligatory example of the construction of the electronic breaking module 16.

In this example, at least one portion of the electronic breaking module 16 is constructed in the form of an integrated unit 80, or even of a plurality of such integrated units 80.

Preferably, the or each integrated unit 80 comprises the power switches 22 associated with one pole of the device (i.e. with one of said electrical conduction lines, which line is itself associated with one electrical phase of the device 2).

The integrated module 80 comprises a plate-shaped substrate 82, for example made of an electrically insulating material.

In practice, it may be a composite material, such as the glass-fiber reinforced epoxy resin commonly referred to as "FR4".

At least some of the power switches 22 are mounted on the substrate 82, in particular on the main faces of the substrate 82.

For example, the transistors T1 and T2 associated with the first connection line are mounted on opposite faces of the substrate 82, as may be seen in insert B) of FIG. 7, these switches here being designated with the reference number 84.

Specifically, as explained above, each transistor T1, T2 illustrated in FIG. 2 may in practice be a group of two transistors connected in parallel, depending in particular on the rating of the device 2 and on the properties of the transistors used.

In the illustrated example, which is given for the purposes of illustration, a group of two transistors connected in parallel forms "transistor T1", these two transistors being mounted on a first face of the substrate 82. A group of two other transistors connected in parallel forms "transistor T2", these two other transistors being mounted on a second face of the substrate 82, the second face of the substrate 82 being opposite the first face of the substrate 82.

Still in this example, the transistors T3, T4 associated with the second connection line are mounted on opposite faces of the substrate 82 of a second integrated unit 80, this second integrated unit 80 being connected in parallel with the present integrated unit 80 and being identical or at least similar to the present integrated unit 80.

This second unit 80 is, for example, mounted beside the first unit 80.

Preferably, the or each integrated unit 80 is accommodated in said aforementioned dedicated housing of the casing 4.

In practice, each power switch 22 may comprise a heat-dissipating plate 86, also called a backing, that surmounts the body of the power switch 22. In other words, the heat-dissipating plate 86 is thermally connected to the body of said power switch.

For example, the heat-dissipating plate 86 is a metal plate natively fastened to the ceramic body of the power switch 22 by the manufacturer of the power switch 22.

Optionally, components of the electronic control circuit 24 may also be mounted on one or both main faces of the substrate 82.

For example, one or more of the current sensors 30 associated with a connection line may be integrated into the corresponding module 80 and mounted on the substrate 82.

The unit 80 also comprises two electrically conductive plates 90 and 92, each plate 90, 92 being mounted on each face of the substrate 82 so as to cover the substrate 82. It will be understood that, in the assembled position, the plates 90 and 92 also cover the components mounted on the faces of the substrate 82.

In this description, the plates 90 and 92 are made of metal and will be referred to as "metal plates" below. However, as a variant, other materials or material compositions may be used provided that the plates 90 and 92 are electrically conductive.

Advantageously, each metal plate 90, 92 makes contact (preferably direct contact) with the metal backing 86 of the corresponding power switches (i.e., power switches 84 placed under this metal plate 90, 92). In other words, each metal plate 90, 92 is electrically and thermally connected to the corresponding power switches 84.

This arrangement makes it possible to use the plates 90 and 92 both as a heat sink and as an electrically conductive element allowing the power switches 22 to be connected.

Specifically, when the power switch 22 is a MOSFET, the metal backing 86 is connected to the drain. Thus, the backing 86 may be passed through by the power current flowing through the connection line of the device 2. The metal plates 90 and 92 are then connected to the terminal 8 and to the terminal 6 of the corresponding connection line, respectively.

Using the backing 86 to conduct the power current does not jeopardize the safety of users, since the backing 86 is electrically insulated from the exterior by the casing 4 of the device, which is made of an electrically insulating material and which prevents a user from touching the backing 86.

The thermal energy released by the switches 22 is here transferred to outside the device 2 via conduction through electrical conductors.

For example, this thermal energy is mainly transferred through conduction and radiation by conductive parts to outside the device 2.

Advantageously, heat-dissipating effects due to air convection may also be used, provided that ventilation orifices, such as ventilation slits or vents, compatible with the criteria in respect of electrical insulation are provided.

To achieve the transfer of thermal energy by conduction, the entirety of the chain through which current passes inside the circuit breaker is employed, i.e., all of the electrical conductors, electrical supply cables and electrical conduction lines that allow current to flow from upstream the device 2 to downstream.

For example, by construction, the connection pins of the circuit breaker are compatible with the maximum temperature of the insulators of the cables, this temperature possibly reaching, for example, a maximum of 90° C. in the case of connection pins connected to copper cables equipped with PVC cladding.

In practice, since the hottest point is generally in the center of the device 2, a temperature profile is observed that decreases from the center of the device 2 to the connection pins used for cable connection.

Advantageously, the metal plates 90 and 92 are made mainly of copper, which has good properties in respect of electrical and thermal conduction.

As a variant, however, other materials having good properties in respect of conduction of electricity and of heat may be used, such as aluminum.

It is also possible to use, to construct the metal plates 90 and 92, materials that have undergone a surface treatment, such as a tin-plated plate, or a plate partially or completely covered with a thin silver layer, to improve certain properties such as the contact resistance between the power switches and metal plates. The surface treatment may also improve radiative transfer, as for example when a paint is employed or an anodization carried out.

Preferably, the metal plates 90 and 92 are oversized with the aim of increasing the transfer of thermal energy, mainly by conduction but also by radiation and convection. This oversizing also contributes to decreasing Joule heating.

Also preferably, in the assembled configuration, the (or each) metal plate(s) 90 and 92 extend(s) parallel to the widest walls of the casing 4. In the illustrated example, these are the side walls of the casing 4 of the device 2, these walls being oriented vertically when the device 2 is mounted in an electrical cabinet or a distribution board. Preferably, each metal plate 90, 92 covers at least 40% of the area of the corresponding face of the side wall of the casing 4.

The thickness of each of the plates 90 and 92 is preferably smaller than or equal to 5 mm and, even more preferably, comprised between 1 mm and 3 mm.

In particular, the larger the thickness of the plates 90 and 92, the greater the thermal conduction, this making heat removal more efficient.

By way of illustrative example, in the case of a module 80 comprising four transistors (two transistors connected in parallel on each face of the substrate 82), each transistor dissipating a thermal power of 1 watt, in the case of a one-pole device with a current rating of 16 amps, it has been found that copper plates 90 and 92 having a thickness of 1.0 mm allow an internal temperature of 114.6° C. to be obtained, while copper plates 90 and 92 having a thickness of 3 mm allow the internal temperature to be decreased to 105° C.

In practice, the substrate 82 may comprise fastening orifices 88 that, in the assembled configuration, are aligned with corresponding orifices drilled in the metal plates 90 and 92.

In the illustrated example, one of the metal plates (in the present case the metal plate 92) comprises a folded segment 94 that is folded with respect to the rest of the metal plate 92, and that for example extends perpendicular to the plane of said metal plate from an edge of said metal plate. In particular, the segment 94 is folded to 90 degrees with respect to the metal plate, so as to be oriented toward the pivoting mobile electrical contact and thus form a fixed contact segment.

The folded segment 94 is here used as a fixed electrical contact that interacts with the mobile contact 10 to together form said separable electrical contacts, as illustrated in FIG. 1, and thus to perform the function of galvanic isolation when the contacts are open.

As a variant, the segment 94 could be replaced by a contact segment taking a different form. For example, the contact segment could be formed directly on an edge or edge face of the metal plate, making a folded protrusion redundant.

As a variant, the folded segment 94 may be omitted. The contact segment may also be omitted, in particular when the plates 90 and 92 and more generally the unit 80 are placed in a casing separate from the casing comprising the mobile electrical contact, as for example in the case mentioned above where the power switches are housed in a casing separate from the casing comprising the switching mechanism. This for example makes it possible to employ a board and metal plates of larger areas.

The metal plates 90 and 92 are here brought into contact by way of a surge arrester 96 that corresponds to the element 26 for protecting against voltage surges described with reference to FIG. 2.

The surge arrester 96 is electrically connected to the metal plates 90 and 92, for example by means of a tin-based solder joint. However, as a variant, other soldering or assembly techniques may be employed. For example, the element 96 is pressed into direct contact with the metal plates 90 and 92 by screwing.

In certain variants, when the protecting element 26 is omitted, the element 96 may be replaced by an electrical conductor.

However, as a variant, the unit 80 may be of different construction.

For example, in the case of a direct-current (DC) device with one-way current flow, it is possible to use only a single power switch. In this case, it is possible to use only one face of the substrate 82 and to use only a single metal plate 90 or 92 covering this face of the substrate, this plate being connected between the terminals 6 and 8. Preferably, this single plate is mounted on the side of the substrate 82 which is opposite the mobile electrical contact 10.

The embodiments in respect of the unit 80 and in particular of the plates 90 and 92 may be implemented independently of the preceding embodiments, and in particular of the embodiments relating to the way in which the switches 22 are controlled and to operation of the sensor 34.

The unit 80 may be constructed with other types of power switches, for example IGBTs, SiC MOSFETs, GaN MOSFETs or SiC JFETs, these examples being non-limiting.

Generally, embodiments in respect of the unit 80 may concern an electrical protection device 2 comprising a casing 4, connection terminals 6, 8, separable electrical contacts 10 connected between the connection terminals 6, 8, a switching mechanism 12 and at least one power switch 22 connected in series with the separable electrical contacts.

The separable electrical contacts 10 are movable between an open state and a closed state, the switching mechanism 12 comprises a control lever 14 and is coupled to the separable electrical contacts 10 with a view to switching the separable electrical contacts to the open state, and the electrical protection device further comprises an electronic control circuit 24 coupled to said at least one power switch 22.

The electrical protection device 2 further comprises at least one power switch, or even a pair of power switches, such as field-effect transistors T1, T2, and preferably MOSFETs, each power switch comprising a metal backing 86 connected to the drain (or more generally to an electrode) of said power switch.

Said metal backing 86 is thermally connected to the body of said power switch, and the power switches are connected in series with separable electrical contacts (capable of forming an air gap) between the connection terminals 6, 8 by way of metal plates 90, 92 connected (electrically and thermally) to the metal backings 86 of the respective power switches.

Other embodiments of the device 2 are nevertheless possible.

In particular, the device 2 may be modified to be used in a single-phase installation, or in a polyphase installation, as explained above.

Figure 8:
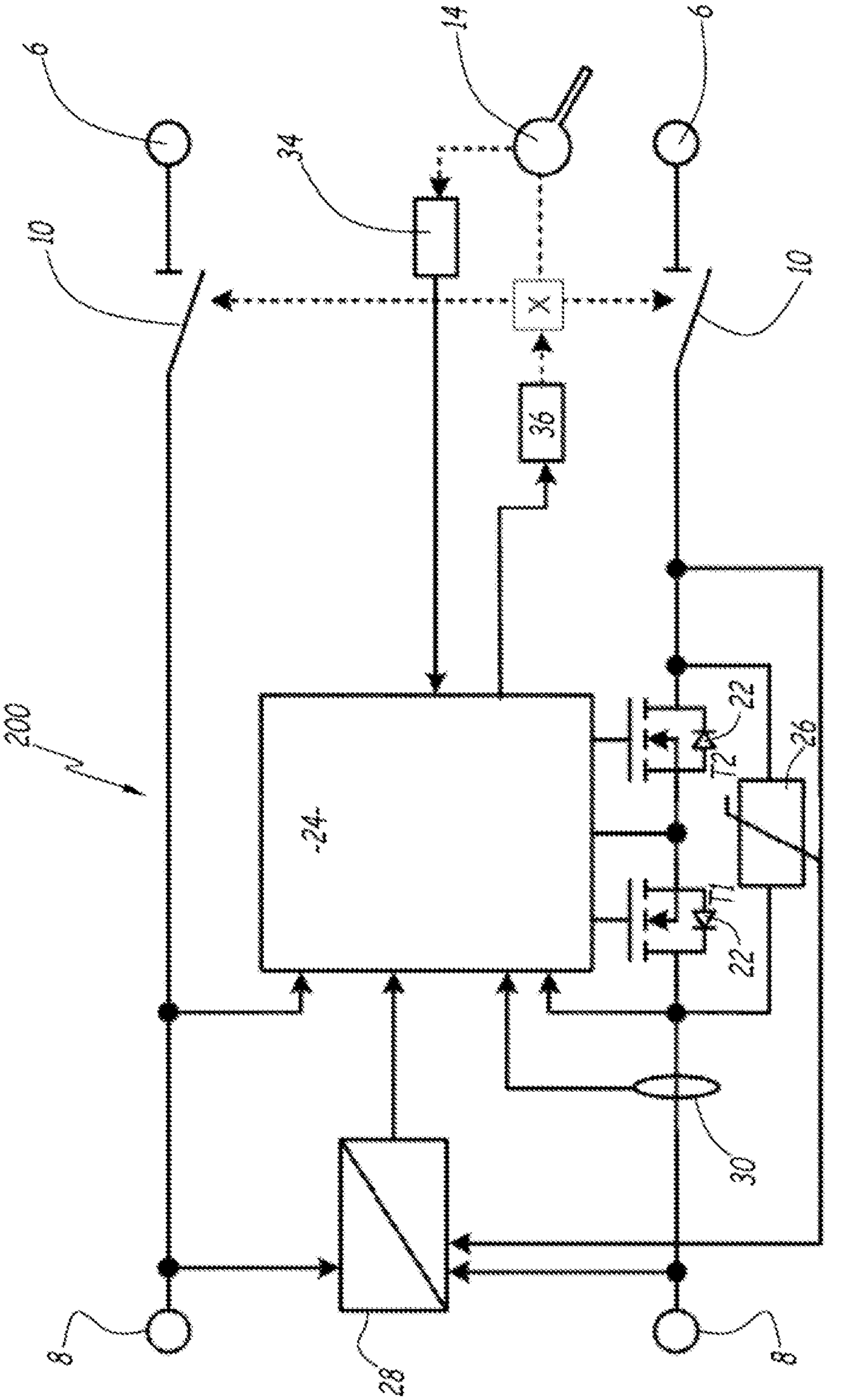
FIG. 8 is a functional diagram of the electrical protection device of FIG. 1 according to a first variant in which the device is a single-phase device.

FIG. 8 shows one embodiment of a single-phase device 200.

The device 200 is similar to the device 2 described with reference to FIG. 2, except that one of the connection lines has been replaced by a neutral conductive line devoid of power switches T3 and T4 (and of the protecting component 26).

Apart from these differences, those elements of the device 200 that are analogous to the corresponding elements of the device 2 have been designated with the same references and will not be described in detail, in so far as the above description may be transposed thereto.

For the sake of readability, certain optional elements of the device 2, such as the auxiliary power supply 38, have not been shown in FIG. 8, although they could optionally feature in this embodiment.

Figure 9:
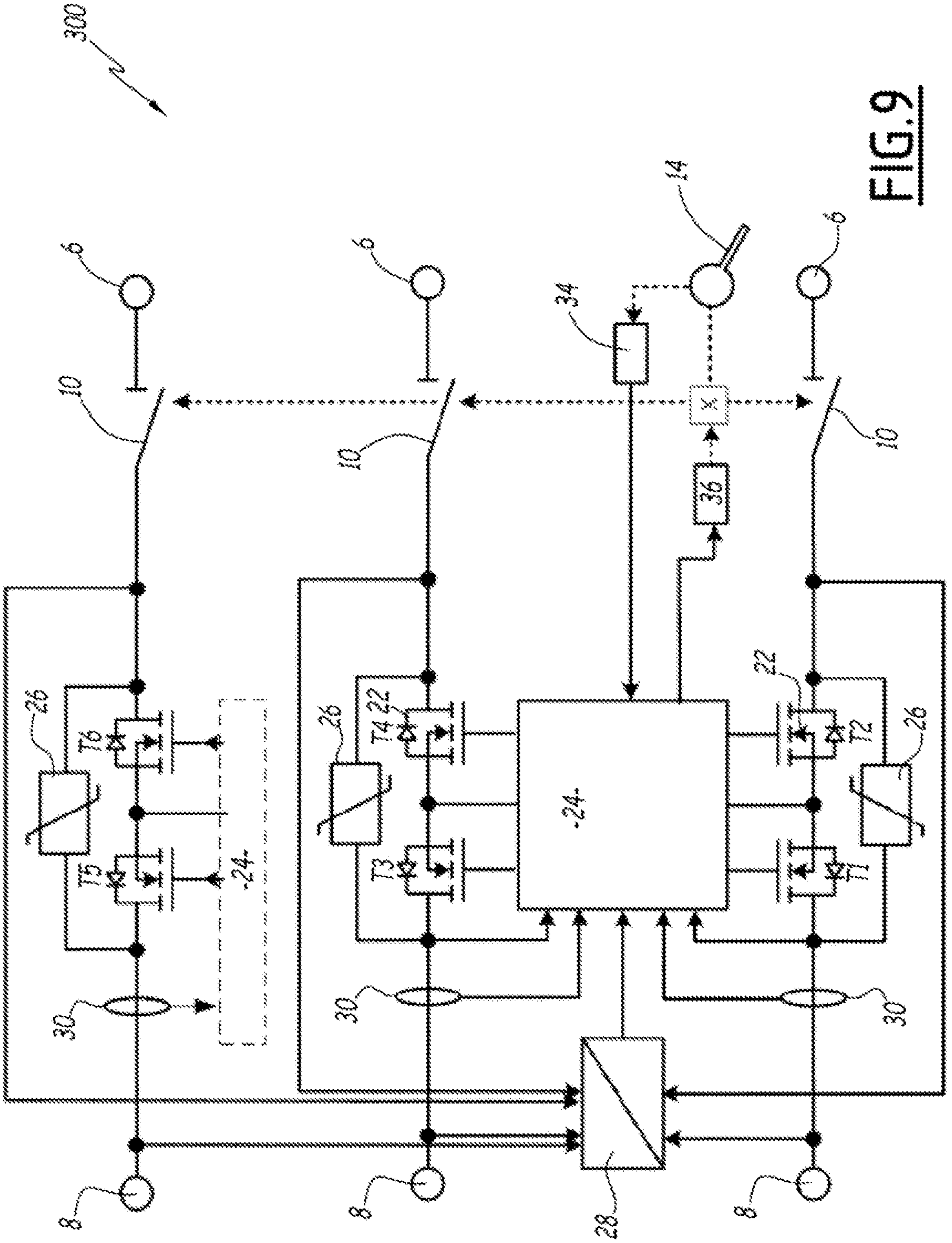
FIG. 9 is a functional diagram of the electrical protection device of FIG. 1 according to a second variant in which the device is a three-phase device.

FIG. 9 shows one embodiment of a three-phase device 300.

The device 300 is similar to the device 2 described with reference to FIG. 2, except that the device 300 comprises a third connection line connected in parallel with the first connection line and second connection line between the terminals 6 and 8.

The third electrical connection line is similar or identical to the first connection line and to the second connection line and comprises at least one of said power switches 22 (here two in number and denoted T5 and T6) and an electrical contact 10 such as described above, connected in series with the one or more power switches 22 by one or more electrical conductors.

Advantageously, the third connection line comprises an element 26 for protecting against voltage surges, which is connected in parallel with the power switches 22, as described above.

Once again, for the sake of readability, certain optional elements of the device 2, such as the auxiliary power supply 38, have not been shown in FIG. 9, although they could optionally feature in this embodiment.

Figure 10:
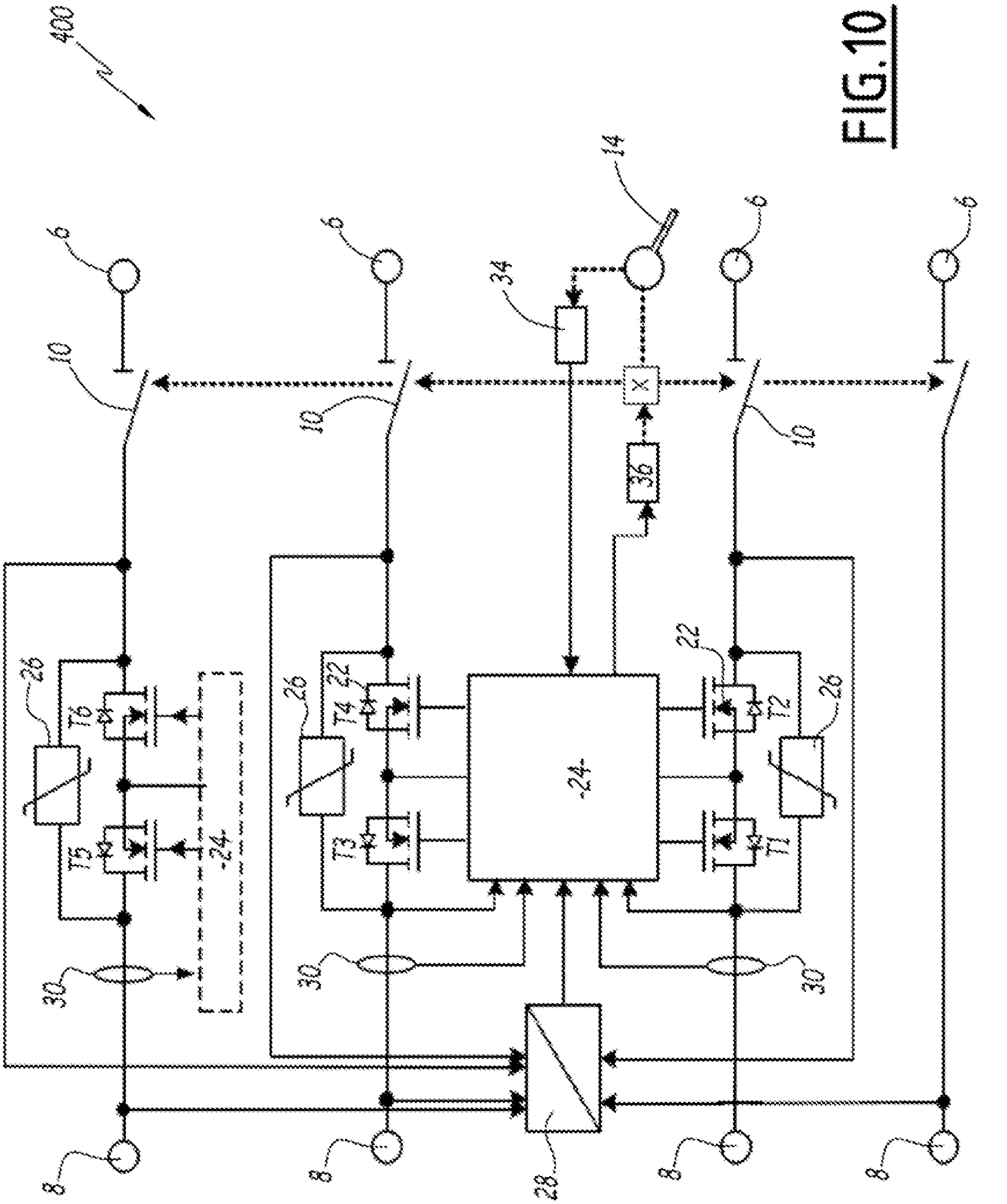
FIG. 10 is a functional diagram of the electrical protection device of FIG. 1 according to a third variant in which the device is a three-phase device with a neutral line.

FIG. 10 shows one embodiment of a three-phase (three-pole) device 400 with a neutral, comprising three electrical connection lines and a neutral line similar to the neutral line of the device 200.

The device 400 is similar to the device 300 described with reference to FIG. 9, except that the device 400 in addition comprises a neutral line connected in parallel with the first connection line and second connection line between the terminals 6 and 8.

Apart from these differences, those elements of the device 400 that are analogous to the corresponding elements of the device 300 have been designated with the same references and will not be described in detail, in so far as the above description may be transposed thereto.

Figure 11:
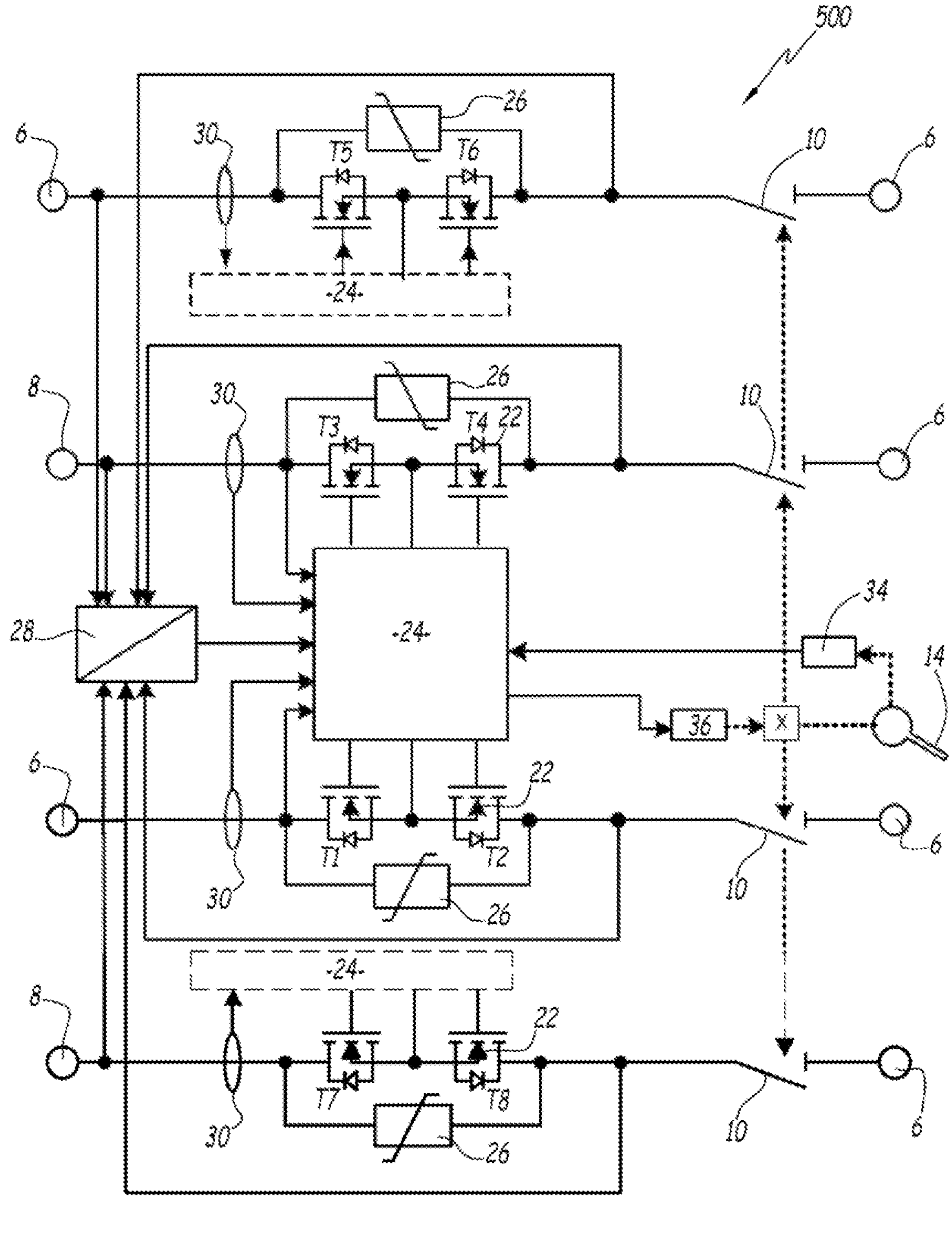
FIG. 11 is a functional diagram of the electrical protection device of FIG. 1 according to a fourth variant in which the device is a four-pole device.

FIG. 11 shows one embodiment of a four-phase (four-pole) device 500 comprising four electrical connection lines similar to the connection lines described above.

The device 500 is similar to the device 4 described with reference to FIG. 10, except that the device 500 comprises, instead of the neutral line, a fourth connection line connected in parallel with the first connection line and second connection line between the terminals 6 and 8.

The fourth electrical connection line is similar or identical to the first connection line and to the second connection line and comprises at least one of said power switches 22 (here two in number and denoted T7 and T8) and an electrical contact 10 such as described above, connected in series with the one or more power switches 22 by one or more electrical conductors.

Advantageously, the fourth connection line comprises an element 26 for protecting against voltage surges, which is connected in parallel with the power switches 22, as described above.

Apart from these differences, those elements of the device 500 that are analogous to the corresponding elements of the device 400 have been designated with the same references and will not be described in detail, in so far as the above description may be transposed thereto.

Once again, in both these cases, for the sake of readability, certain optional elements, such as the auxiliary power supply 38, have not been shown in FIGS. 10 and 11, although they could optionally feature in these embodiments.

The embodiments and the variants envisioned above may be combined with one another to create new embodiments.

The invention claimed is:

1. An electrical protection system, comprising:

connection terminals, separable electrical contacts connected between the connection terminals, a switching mechanism and at least one power switch connected in series with the separable electrical contacts, the separable electrical contacts being movable between an open state and a closed state, the switching mechanism comprising a movable control lever and being coupled to the separable electrical contacts to switch the separable electrical contacts to the open state, an electronic control circuit coupled to said at least one power switch, a sensor coupled to the control lever to measure a position of the switching mechanism, wherein the electronic control circuit is configured to switch said at least one power switch to an off state when the sensor detects that the switching mechanism has reached a position preceding a position from which the separable electrical contacts separate, wherein a movement of the control lever of the switching mechanism is configured to cause an angular offset between the rotation of the control lever and moving to the open state of the separable electrical contacts, wherein the angular offset enables compensating for a reduction in a clearance of the separable electrical contacts caused by wear of the separable electrical contacts.

2. The electrical protection system as claimed in claim 1, wherein the electronic control circuit is configured to switch said at least one power switch to the off state when an electrical fault is detected by a measuring circuit.

3. The electrical protection system as claimed in claim 1, wherein the electrical protection system comprises an internal electrical power supply configured to electrically power the electrical control circuit using the electrical voltage across the connection terminals.

4. The electrical protection system as claimed in claim 1, wherein said at least one power switch is a MOSFET.

5. The electrical protection system as claimed in claim 1, wherein said at least one power switch is normally open.

6. The electrical protection system as claimed in claim 1, wherein the electronic control circuit comprises a plate-shaped substrate and a conductive plate making contact with a metal backing of said corresponding at least one power switch, said at least one power switch and its respective conductive plate being mounted on one or each face of the substrate.

7. The electrical protection system as claimed in claim 6, wherein at least one of the conductive plates comprises a segment configured to form a fixed electrical contact that interacts with a mobile electrical contact to form together said separable electrical contacts.

8. The electrical protection system as claimed in claim 1, wherein the switching mechanism is a toggle mechanism.

9. The electrical protection system as claimed in claim 1, wherein the electrical protection system is configured such that, to close the separable electrical contacts, the control lever is configured to be moved to the corresponding position by a user, this movement, by way of a link rod of the switching mechanism, driving a hook of the switching mechanism to rotate, the hook becoming hooked on a tripping bar of the switching mechanism, the link rod then driving a deck of the switching mechanism to rotate until the separable electrical contacts close.

10. The electrical protection system as claimed in claim 1, wherein the electronic control circuit is configured to switch said at least one power switch to an off state when the sensor detects that the switching mechanism has reached a position immediately preceding a position from which the electrical contacts separate.

11. An electrical protection device comprising a casing and the electrical protection system as claimed in claim 1, wherein the electrical protection device is a miniature circuit breaker.

12. The electrical protection device as claimed in claim 11, wherein the electronic control circuit and said at least one power switch are housed in a dedicated compartment inside the casing.

13. The electrical protection device as claimed in claim 11, wherein the width of the casing is a multiple of 9 mm.

14. An electrical protection device comprising a casing and the electrical protection system as claimed in claim 1, wherein the electrical protection device is an air circuit breaker.

* * * * *